United States Patent [19]

Buckwalter, Jr.

[11] 4,285,992
[45] Aug. 25, 1981

[54] PROCESS FOR PREPARING IMPROVED SILVERED GLASS MIRRORS

[75] Inventor: Charles Q. Buckwalter, Jr., Benton, Wash.

[73] Assignee: The United States of America as represented by the United States Department of Energy, Washington, D.C.

[21] Appl. No.: 115,868

[22] Filed: Jan. 28, 1980

[51] Int. Cl.$^3$ .................. B05D 1/36; B05D 1/34; C03C 17/38; G02B 5/08
[52] U.S. Cl. .................................. 427/165; 427/168
[58] Field of Search ................ 427/168, 165; 428/622

[56] References Cited

U.S. PATENT DOCUMENTS 2,899,333  8/1959  Gee et al. ...................... 427/168 X

OTHER PUBLICATIONS

Wein, "Sensitizing-A Process Used in Silvering", Jul. 1954.
Schweig, "Mirrors", Pelham Books, London, 1973.

Primary Examiner—James R. Hoffman
Attorney, Agent, or Firm—James W. Weinberger; Richard G. Besha; James E. Denny

[57] ABSTRACT

Glass mirrors having improved weathering properties are prepared by an improvement in the process for making the mirrors. The glass surface after it has been cleaned but before it is silvered, is contacted with a solution of lanthanide rare earths in addition to a sensitization solution of tin or palladium. The addition of the rare earths produces a mirror which has increased resistance to delamination of the silver from the glass surface in the presence of water.

7 Claims, No Drawings

PROCESS FOR PREPARING IMPROVED SILVERED GLASS MIRRORS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to an improvement in the method for making mirrors. More specifically this invention relates to an improved method for making mirrors which produces mirrors that are less susceptible to degradation due to weathering.

Increasing costs of energy furnished by fossil and nuclear fuels, in addition to forecasted shortages of fossil fuels, have stimulated a search for ways in which modern technology can help to provide options in the use of alternative sources of energy. One obvious source of thermal energy is that derived from the sun.

A number of devices have been built or are being being designed which utilize thermal energy from the sun in some way or another. One system currently under construction utilizes a large array of individually controlled tracking mirrors to redirect incident solar radiation to a central receiver or boiler at the top of a tower where the solar energy is absorbed and converted to heat by a black body placed in the focal region. These tracking mirrors are known as heliostats and may, in a large commercial installation, occupy as much as a square mile or more of area. This is necessary in order to direct sufficient solar radiation to the central receiver or power tower to provide enough thermal energy to ultimately operate a conventional steam turbine generating station. It is vitally important to the overall efficiency of the system that the mirrors reflect as much of the incident solar energy as possible and that this efficiency be maintained for long periods of time without appreciable deterioration.

Mirrors presently under consideration include silvered float process glass and metallized thin films with a protective coating. Mirrors of silvered glass are well suited for use in solar energy heliostats since they have a higher weighted solar reflectance than do metallized thin films. They are however, after a period of exposure to the weather subject to delamination of the silver backing from the surface of the glass. This results in a substantial reduction in the amount of incident light redirected to the collector.

The silvered glass mirrors used for heliostats, are second surface mirrors which have a conventional four layer structure which has changed very little in many years. The glass serves as the substrate for the mirror deposition process and also provides a hard, cleanable surface for the finished product. Mirrors are commonly coated on ⅛ or ¼ inch glass. A thin silver coating serves as the reflective layer and provides a flat reflectance across the visible spectrum. In conventional mirrors the silver layer is about 700 A in thickness which corresponds to about 70 mg/ft$^2$. Over the the silver is a layer of copper, whose function is not well understood. One possible function is to serve as a stress relief layer between the silver and the outer paint layer to accomodate differential dimension changes due to paint shrinkage upon curing and thermal expansion that could occur during paint drying or normal use. An alternate function may be to serve as a sacrificial layer for preservation of the silver layer. The copper layer may also provide improved adhesion between the metal and paint layers. Generally the copper layer is about 300 A thick corresponding to about 25 mg/ft$^2$.

An outer paint layer provides a protective coating over the metallic films to prevent damage. This includes abrasion resistance for the mirror between production and final mounting. Generally the paint coatings are about 0.001 inch thick corresponding to about 6–10 g/ft$^2$.

The first step in the production of mirrors is to scrub the glass with an abrasive, generally a slurry of cerium oxide, in order to remove contaminents and provide a clean surface for mirroring. After rinsing the slurry from the glass, a sensitizing solution is applied to the surface. This serves to hasten the silver deposition rate and improve adhesion of the silver to the glass. The use use of stannous chloride is most common although palladium chloride is also occasionally used in place of the tin. The role of the sensitizer is not completely understood, but it is believed to form tin sites on the surface of the glass which serve as nucleation centers for the silver layer deposition process.

After the sensitizing solution has been thoroughly rinsed from the glass with deionized water and, while the surface is still wet, the silvering chemicals are sprayed on the sensitized glass. The most commonly used chemical deposition system consists of three separate solutions, a silver solution such as silver nitrate, a caustic such as sodium hydroxide and a reducer such as formaldehyde or dextrose. The chemical reaction results in the precipitation of a silver layer when the three solutions are mixed, by the simultaneous spray application of the solutions on the surface of the glass. After completion of silvering, the solutions are thoroughly rinsed from the glass to terminate the precipitation reaction and to prevent entry of residual silver solutions into the copper deposition region, which would otherwise degrade the mirror quality.

The copper layer is generally applied by chemical deposition and commonly uses a slurry of iron filings in water together with a solution of soluble copper such as copper sulfate. The precipitation reaction begins when the solutions are mixed on the surface of the silver. Other systems may also be used which do not employ the iron filing slurry. Alternatively, the copper layer may be applied by electrolyte deposition. Upon completion of the copper deposition step, the surface is carefully washed to remove the copper solutions from the surface and air dried.

The mirror is heated, usually with infrared radiation from the uncoated glass side, to partially cure the metal layers by driving residual water from them before the final protective coating of paint applied to the back of the mirror by rolling, spraying or by curtain coating. After drying, the mirror is ready for shipment.

While mirrors have been produced by the above described method for many years, they have not been completely satisfactory. For example, when the mirrors are subjected to a high moisture environment such as the out-of-doors, for any extended period of time, they are prone to debonding or delamination of the silver reflective coating from the glass surface. This causes a substantial reduction in the reflectivity of the mirror rendering them unsuitable for use as heliostats.

SUMMARY OF THE INVENTION

An improvement in the process for making mirrors has been discovered which increases the silver to glass bond and which produces a mirror having improved moisture resistance and weathering capabilities when compared to mirrors made by the above described prior art method. It has been found that, if the cleaned surface of the glass is contacted with lanthanide rare earth ions before the surface is silvered, the resulting mirror has an improved resistance to moisture and weathering. The invention therefore relates to an improvement in the method for preparing glass mirrors, in which the cleaned surface of the glass is contacted with a solution of lanthanide ions in addition a tin or palladium sensitizing solution before the surface is silvered whereby the resulting mirror, has increased resistance to delamination of the silver layer from the glass surface due to the presence of moisture and therefore has improved weathering properties.

It is therefore one object of the invention to provide an improved method for preparing silvered glass mirrors.

It is another object of the invention to provide a method for preparing silvered glass mirrors which have improved weathering properties.

It is still another object of the invention to provide a method for preparing silvered glass means which have increased resistance to delamination of the silver layer from the surface of the glass in the presence of moisture.

Finally, it is the object of the invention to provide a silvered glass mirror which is resistant to delamination of the silver layer from the glass surface in the presence of moisture.

DETAILED DESCRIPTION OF THE PREFERRED EMBODIMENT

The lanthanide rare earth ions may be applied to the glass surface any time after the glass has been cleaned and rinsed and before the silvering solutions are applied. The ions may be applied as a separate solution either before or after the surface has been sensitized or the lanthanide ions may be added to the sensitizing solution so that the surface is sensitized and contacted with lanthanide ions at the same time.

Any of the lanthanide rare earth ions are satisfactory for the method of the invention, although europium having a stable +2 valence state does not provide as good a mirror surface as the rare earths having stable +3 valence states. Lanthanides which have been found to be particularly satisfactory include neodymium, praseodymium, erbium, lanthanum, samarium and dysprosium. The rare earths may be present as any water-soluble salt such as the chloride or nitrate. Preferably the solution may contain about 0.1 weight percent of rare earth salt, although the concentration may vary from about 0.01 to 1.0 weight percent. Concentrations of greater than about 1.0 percent should be avoided since they may interfere with the nucleation of the silver to the tin on the surface of the glass. The solutions may contain one or more lanthanide ions.

Solutions of lanthanide ions which are to be applied separately, either before or after, the sensitizing solution, should be made acid, i.e. below pH7, preferably about pH 2.5 to 3.0, to reduce the number of hydroxyl ligands on the lanthanide ions.

While we do not wish to be bound by the following explanation, it gives the best presently available theory on why the contact of lanthanide ions on the surface of the glass acts to improve the weathering resistance of the mirrors.

It is known that water can degrade glass, probably by attack of hydroxide ions on the glass matrix. The hydroxide ion is generated under ambient environmental conditions through an equilibrium process involving water. Furthermore, the mirror production process introduces hydroxide concentrations into the glass matrix several orders of magnitude greater than the normal water equilibrium. Thus, the manufacturing process may initiate the degradation of the glass with subsequent degradation promoted by environmental moisture.

It is also known that the hydroxide ion can penetrate the glass surface for 300 to 500 A. This appears to be a sufficient depth to initiate significant attack on the silicate structure. As the silica matrix dissolves, the glass interface will degrade causing the silver layer to delaminate from the glass surface.

The actual silver to glass bond is not very strong, but appears to be enhanced considerably by the tin sensitization step. Apparently the tin acts as an intermediary bonding to the glass surface and to the silver deposited above it. Minimal concentration levels indicate the separation of these islands should be on the order of 1000 A.

It is believed that the rare earth ions enter the glass surface as modifiers as opposed to entering the silica network. In this role, they effectively block openings in the structure which normally allowing rapid transport of alkali, $H^+$ etc, thereby effectively increasing the resistance of the surface of the glass to hydroxide attack and preserving the integrity of the silver to glass interface.

EXAMPLE I

A number of mirrors were prepared by the following general method in order to study the effects of the use of various lanthanide ions and to compare mirrors prepared with the lanthanides to those prepared without them.

Float glass was used, taking care to use the side exposed to air during manufacture and not the tin-contaminated side. The air side was scrubbed with a $CeO_2$ paste and rinsed with deionized water. The glass was sensitized using a freshly prepared solution of 0.1% stannous chloride in deionized water. The silvering solution was prepared by adding 1.0 g $AgNO_3$ and 0.8 ml $NH_4OH$ to 250 ml deionized water to form Solution A. Then 100 g of NaOH was mixed with 750 ml of deionized water and also added to the solution. Next 40 ml of $NH_4OH$ was mixed with 250 ml of deionized water and also added to Solution A which was diluted at a ratio of 8 to 100 with water for final use. (It might be noted that too much $NH_4OH$ may render the solution explosive.) A sugar reducing solution was prepared by mixing 75 g D-glucose with 2375 ml deionized water to which was then added 75 to 150 g sucrose. The sugar and silvering solutions were then sprayed simultaneously onto the sensitized surface of the glass.

1 to 2 g of $CuSO_4$ were mixed with 1000 ml deionized water and the pH adjusted to 0.8 to 1.6 with $H_2SO_4$. A slurry was prepared by mixing 20–40 grams of iron powder (0.005–0.1 mm in diameter) with 1000 ml of water, and the two solutions were sprayed simultaneously on the silver layer to precipitate the copper and form a protective layer over the silver.

A number of 0.1% lanthanide solutions were prepared from the chloride salts of Nd, Pr, Er, La, Sm and Dy, and the pH adjusted to about 2.8. A number of mirrors were prepared by spraying various lanthanide solutions simultaneously with the stannous chloride sensitizing solution onto the cleaned glass surface and silvering the sensitized surface as herein before described. A set of control mirrors were also prepared in a similar manner without using any lanthanides.

The mirrors were tested for weathering qualities by inserting mirrors prepared using various lanthanide salts, control mirrors and commercially prepared mirrors vertically into boiling deionized water for a three hour minimum time period. In six out of six tests, the mirrors prepared using a lanthanide salt showed little degradation. The control mirror, made locally, and the commercially prepared mirror both degraded considerably more than the lanthanide mirrors. The results are given in Table 1 below:

TABLE I

| Sample | Time | Results |
| --- | --- | --- |
| Control | 3 hrs | evidenced degradation* at edges and center of mirror piece after 45 minutes |
| Commercial | 3 hrs | edge and center degradation after 45 minutes |
| $Sm^{3+}$ | 3 hrs | no degradation at edges or center |
| $Dy^{3+}$ | 3 hrs | no degradation at edges or center |
| $La^{3+}$ | 3 hrs | no degradation at edges or center |
| $Er^{3+}$ | 3 hrs | no degradation at edges or center |
| $Nd^{3+}$ | 3 hrs | no degradation at edges or center |
| $Sm^{3+}$ | 8 hrs | showed evidence of silver dissolution but no degradation |
| Commercial | 8 hrs | fully degraded** |
| Control | 8 hrs | fully degraded |

*Degradation means the silver layer pulls off of the glass surface exposing the glass.
**By fully degraded is meant very little silver is left on the glass surface only "islands" of silver remain. All tests were run in boiling distilled water.

It can be seen from the preceding description and Example that contacting the surface of the cleaned glass with a solution containing a small amount of a lanthanide ion either before, during or after sensitization and before the glass is silvered, results in a mirror which has a greatly increased resistance to moisture attack and weathering. Furthermore, the use of lanthanides in the industrial process has the advantage that it can be implemented with no capital investment. Since the solutions can be codeposited with the tin chloride sensitization solution, no modification of the wet process silver production line is required.

The embodiments of the invention in which an exclusive property of privilege is claimed are defined as follows:

1. In the method for preparing silvered mirrors of glass, wherein one surface of the glass is scrubbed with a slurry of an abrasive to clean the surface, a solution of a soluble compound of tin or palladium is applied to the cleaned surface to sensitize the glass, and the sensitized surface is contacted simultaneously with a solution of a soluble silver compound and one or more solutions of caustic and reducer which together with the silver solution react to precipitate a layer of silver on the sensitized surface of the glass, a layer of copper is applied over the layer of silver, and a layer of paint is applied over the layer of copper, the improvement which comprises applying a solution of a soluble compound of lanthanide rare earth ions to the cleaned surface of the glass before the silver is precipitated on the sensitized surface whereby the layer of silver has increased resistance to delamination from the surface of the glass in the presence of moisture.

2. The process of claim 1 wherein the cleaned glass surface is contacted with the solution of rare earth ions before the surface is sensitized, the solution being acidic and containing from 0.01 to 1.0 weight percent rare earths.

3. The process of claim 2 wherein the rare earths are selected from the group consisting of neodymium, praseodymium, erbium, lanthanum, samarium, and dysprosium.

4. The process of claim 1 wherein the cleaned glass surface is contacted with the solution of rare earth after the surface has been sensitized, the solution being acidic and containing from about 0.01 to 1.0 weight percent of rare earths.

5. The process of claim 4 wherein the rare earths are selected from the group consisting of neodymium, praseodymium, erbium, lanthanum, samarium, and dysprosium.

6. The process of claim 5 wherein the sensitizing solution also contains from 0.01 to 1.0 weight percent rare earths whereby the cleaned glass surface is contacted simultaneously with the tin or palladium and the rare earths.

7. The process of claim 6 wherein the rare earths are selected from the group consisting of neodymium, praseodymium, erbium, lanthanum, samarium, and dysprosium.

* * * * *